(12) United States Patent
Wenglinski

(10) Patent No.: US 6,364,589 B1
(45) Date of Patent: Apr. 2, 2002

(54) PANEL FASTENER ASSEMBLY

(75) Inventor: Paul Virgil Wenglinski, Taylor, MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/785,584

(22) Filed: Feb. 16, 2001

(51) Int. Cl.[7] ................................................ F16B 19/00
(52) U.S. Cl. ......................... 411/508; 411/513; 24/297
(58) Field of Search ................................ 411/508, 509, 411/510, 513, 913; 24/297, 453

(56) References Cited

U.S. PATENT DOCUMENTS

| | | | | |
|---|---|---|---|---|
| 2,589,482 A | * | 3/1952 | Downey | |
| 4,389,759 A | * | 6/1983 | Yuda | |
| 5,106,223 A | * | 4/1992 | Kraus | |
| 5,195,793 A | * | 3/1993 | Maki | |
| 5,695,307 A | * | 12/1997 | Takahashi | |

\* cited by examiner

*Primary Examiner*—Flemming Saether
(74) *Attorney, Agent, or Firm*—Clark Hill PLC

(57) ABSTRACT

A fastener assembly for attaching a trim panel to a support panel. The fastener assembly includes a clip portion having a handle end, a guide leg projecting from the handle end and a pair of locking legs projecting from the handle end and spaced parallel on opposing sides of the guide leg. The fastener assembly further includes a base portion having a bridge portion extending from a pair of base plates and defining a slot therebetween for removably receiving the guide leg therethrough, a pair of locating projections extending longitudinally from the respective pair of base plates opposite the bridge to a distal end, and a locking tab projecting from each of the locating projections toward the base plates. The base portion is adapted to retain the support panel between the locking tabs and the base plates and the clip portion is cooperable with the base portion to retain the trim panel between the base plates and the clip portion.

7 Claims, 3 Drawing Sheets

PANEL FASTENER ASSEMBLY

BACKGROUND OF THE INVENTION

1. Field of Invention

The subject invention relates to a panel fastener assembly for removably fastening an interior component to a structure support member of an automotive vehicle.

2. Description of the Related Art

Automotive vehicle include various interior components, such as door panels, armrests, dash panels, and headliners, which are secured to the inner sheet metal support structure of the vehicle. Typically, theses interior components are secured to the inner sheet metal by a plurality of screws or non-removable fasteners. The securing of the components to the sheet metal by use of screw or permanent/non-removable fasteners requires additional assembly time, tools and expense and also limits the serviceability to the component, inner sheet metal or structures enclosed therebetween.

Therefore, it is desirable to provide a fastener assembly for readily and removably fastening an interior component to a structure support member, such as the inner sheet.

SUMMARY OF THE INVENTION

The subject invention relates to a fastener assembly for attaching a trim panel to a support panel. The fastener assembly includes a clip portion having a handle end, a guide leg projecting from the handle end and a pair of locking legs projecting from the handle end and spaced parallel on opposing sides of the guide leg. The fastener assembly further includes a base portion having a bridge portion extending from at least one base plate and defining a slot therebetween for removably receiving the guide leg therethrough, at least one locating projection extending longitudinally from the base plate opposite the bridge to a distal end, and at least one locking tab projecting from the locating projection toward the base plate. The base portion is adapted to retain the support panel between the locking tab and the base plate and the clip portion is cooperable with the base portion to retain the trim panel between the base plate and the clip portion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
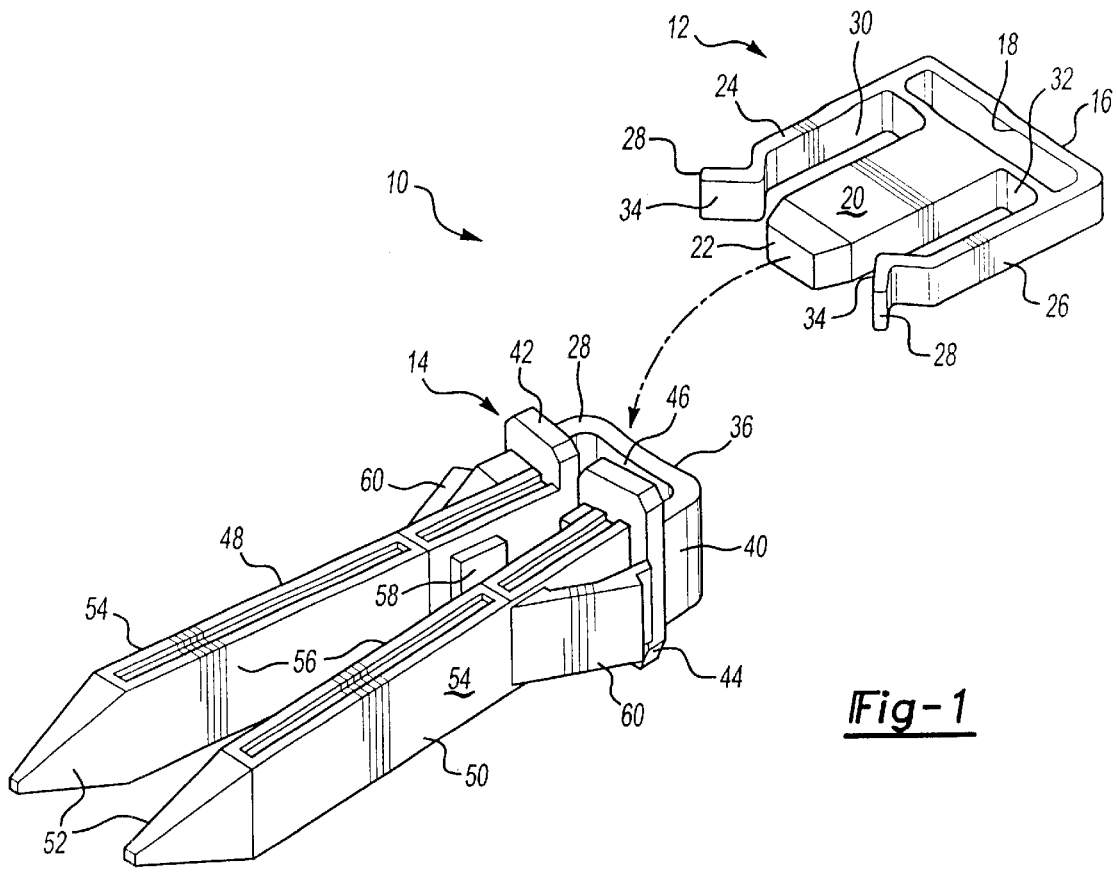
FIG. 1 is a perspective view of the fastener assembly according to the preferred embodiment of the invention.
Figure 2:
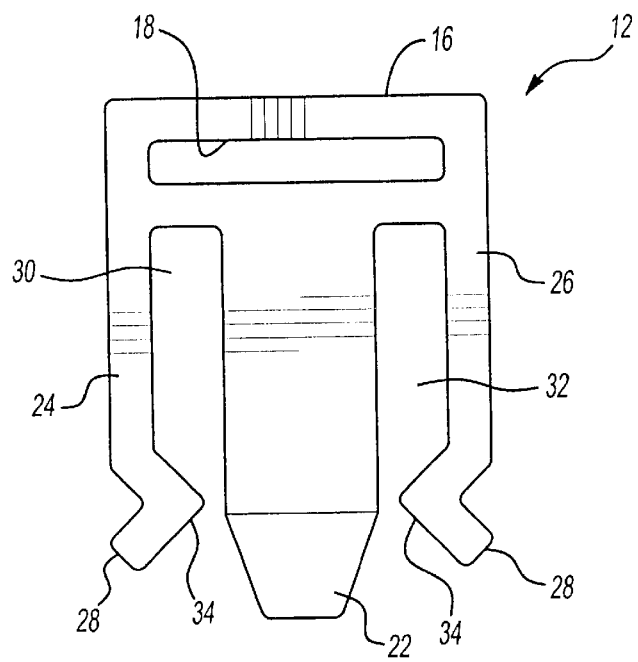
FIG. 2 is a side view of the clip portion of the fastener assembly.

Referring to FIG. 1, a fastener assembly is shown at 10 for removably fastening a trim panel to a support panel of an automotive vehicle. The trim panel may include an interior component of a vehicle such as a door panel, armrest, headliner, door handle cover, molded trim panel, or the like. The support panel includes any structural support portion of the vehicle such as a sheet metal panel of the vehicle door or side wall. The fastener assembly 10 is preferably constructed of molded plastic and includes a clip portion 12 and a base portion 14. Referring to FIGS. 1 and 2, the clip portion 12 is generally rectangular in shape and includes a handle end 16 having an elongated slot 18 therein. A centrally located guide leg 20 projects from the handle end 16 to a tapered distal end 22. A pair of resilient locking legs 24, 26 also project from the opposing ends of the handled end 16 to a distal hook end 28. The locking legs 24, 26 are spaced outwardly from the guide leg 20 defining channels 30, 32. The distal hook ends 28 form a locking or retaining portion defined by a inwardly projecting bulbous portion 34.

Figure 3:
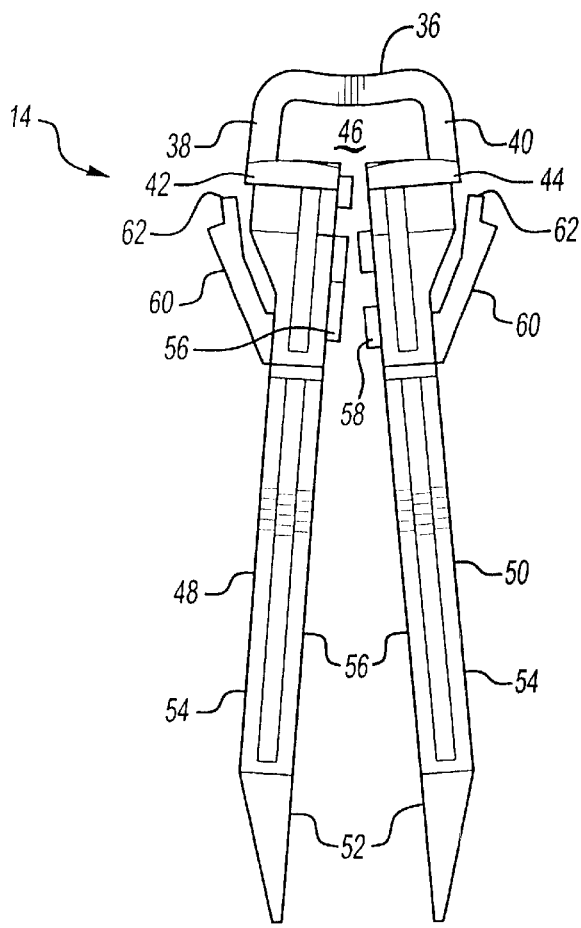
FIG. 3 is a side view of the base portion of the fastener assembly.
Figure 4:
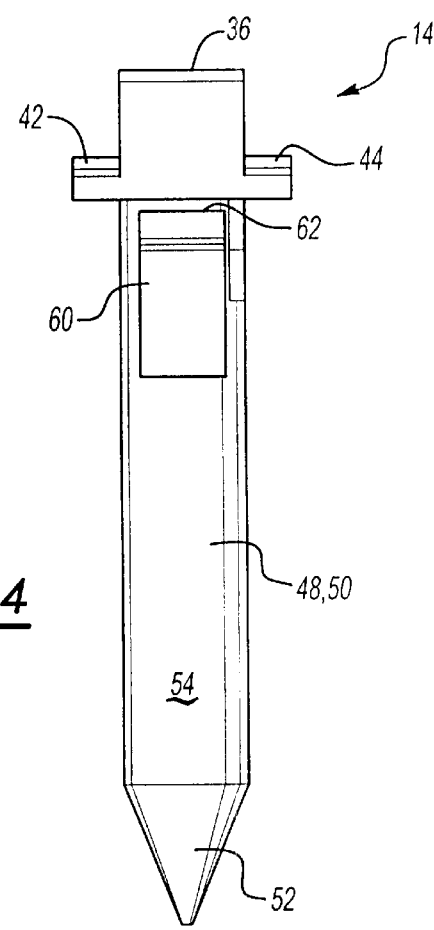
FIG. 4 is another side view of the base portion of the fastener assembly.

Referring to FIGS. 1, 3 and 4, the base portion 14 is an elongated member having a first end defined by a resilient locking bridge 36 having a pair of spaced apart legs 38, 40 projecting from a respective pair of base plates 42, 44. The upper portion of the locking bridge 36 is spaced from the base plates 42, 44 by the legs 38, 40 to define a slot 46 therebetween. The base portion 14 further includes a pair of locating projections 48, 50 extending longitudinally from the respective base plates 42, 44 to a tapered distal end 52. Each locating projection 48, 50 includes an outer surface 54 and an inner surface 56 having a plurality of interlocking nubs 58 for joining the inner surfaces 56 and projections 48, 50 and forming a one piece locator. Each locating projection 48, 50 includes a locking tab 60 projecting upwardly and outwardly from each of the outer surfaces 54 toward the base plates 42, 44, respectively, and terminating at a distal end 62 spaced a predetermined distance below the bottom of the base plates 42, 44.

Figure 5:
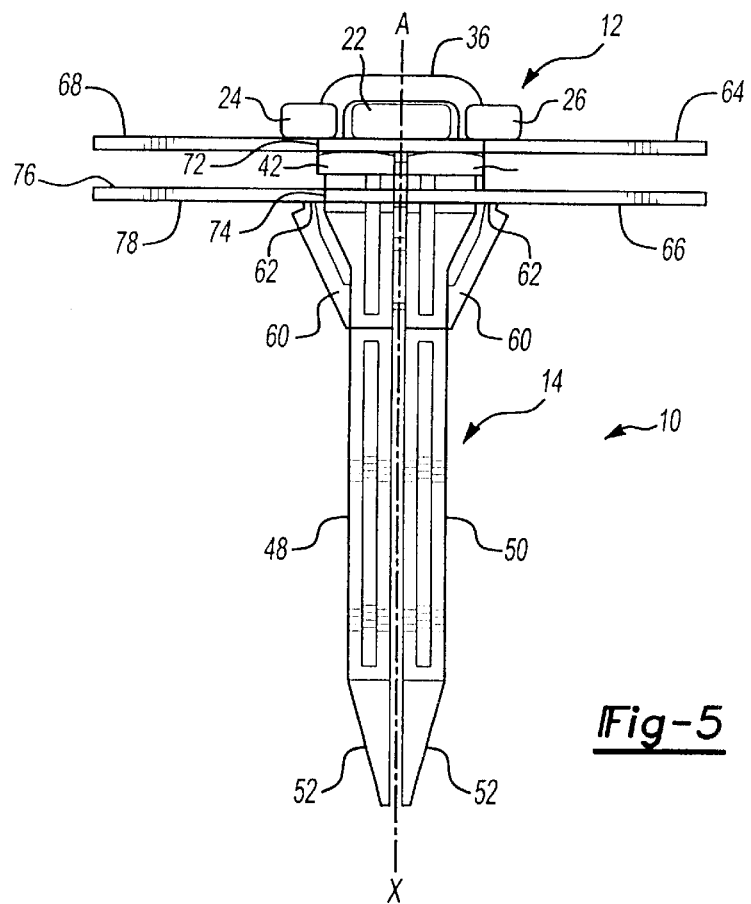
FIG. 5 is a side view of the fastener assembly securing a trim panel to a support panel.
Figure 6:
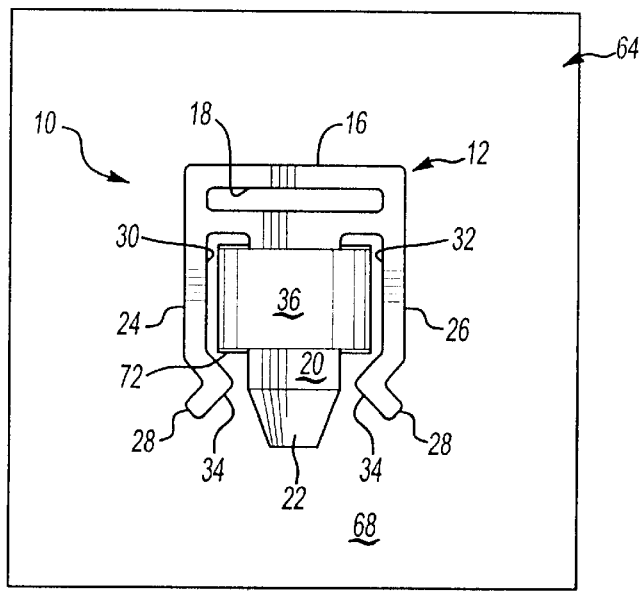
FIG. 6 is a top view of the fastener assembly of FIG. 5.

In assembly, referring to FIGS. 5 and 6, the fastener assembly 10 is shown securing a generally planar trim panel 64 to a generally planar support panel 66 along a longitudinal axis X. The trim panel 64 has opposing surfaces 68, 70 and includes at least one aperture 72 adapted to be aligned axially with at least one aperture 74 in the support panel 66 during the installation of the trim panel 64 onto the support panel 66. The support panel 66 also has opposing surfaces 76, 78. The resilient locking bridge 36 is inserted through the aperture 72 in the trim panel 64 until the base plates 42, 44 abut against the surface 70 thereof. The slot 46 is disposed adjacent the opposing surface 68 of the trim panel 64 and the projections 48, 50 extend transversely from the plane of the panel 64. The base portion 14 may be secured to the trim panel 64 by inserting the guide leg 20 through the slot 46. The bulbous portions 34 of the locking legs 24, 26 engage the respective legs 38, 40 of the bridge 36 and flex the legs 24, 26 outwardly until the legs 38, 40 are received within the channels 30, 32 of the clip portion 12. The legs 24, 26 and guide leg 20 rest on the surface 68 and the guide leg 20 is retained between the bridge 36 and the trim panel 64. The clip portion 12 is further interlocked with the base portion 14 by the bulbous portions 34 retaining the legs 38, 40 of the bridge 36 within the respective channels 30, 32. Therefore, the trim panel 64 is locked or sandwiched between the clip portion 12 and the base plates 42, 44 of the base portion 14. The locating projections 48, 50 may now be aligned axially with the aperture 74 in the support panel 66.

With the inner surfaces 56 and projections 48, 50 joined together by the nubs 58, the one piece projection may be aligned and inserted through one aperture 74. Alternatively, if the support panel 66 includes a pair of spaced apart apertures, the projections 48, 50 may be separated via the resilient bridge 36 such that each of the projections 48, 50 may be inserted through a respective aperture in the panel 66. Referring to FIG. 5, the distal ends 52 of the projections 48, 50 locate and align the base portion 14, and thus the trim panel 64, with the aperture 74 and support panel 66. The base portion 14 is pressed into the aperture 74 until the resilient locking tabs 60 are flexed inwardly against the outer surfaces 54 of the projections 48, 50 and inserted through the aperture 74. Once the distal ends 62 of the locking tabs 60 pass through the aperture 74 the locking tabs 60 return to the original outwardly projecting position and the distal ends 62 lock or abut against the surface 78 of the support panel 66 outside of the aperture 74. The base plates 42, 44 engage the opposite surface 76 of the panel 66 to lock or sandwich the panel 66 between the base plates 42, 44 and the locking tabs 60.

Alternatively, the base portion 14 of the fastener assembly 10 may be connected to the support panel 66 prior to the attachment to the trim panel 64 by the clip portion 12.

The fastener assembly 10 is also removable to allow for disassembly of the trim panel 64 from the support panel 66. The disassemble, the clip portion 12 is removed from engagement with the base portion 14 by pulling on the handle end 16 and sliding the guide leg 20 from the slot 46 formed by the bridge 36. The bulbous portions 34 of the locking legs 24, 26 engage the legs 38, 40 and flex outwardly to unlock and release the clip portion 12 from the base portion 14. With the clip portion 12 removed, the trim panel 64 may be removed from the support panel 66. The base portion 14 remains connected to the support panel 66 by the locking tabs 60 and the bridge 36 projects from the aperture 74 to receive the trim panel 64 and clip portion 12 for re-assembly thereof.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A fastener assembly for attaching a trim panel to a support panel, said fastener assembly including:
   a clip portion having a handle end, a guide leg projecting from said handle end and a pair of locking legs projecting from said handle end and spaced parallel on opposing sides of said guide leg;
   a base portion having a bridge portion extending from at least one base plate and defining a slot therebetween for removably receiving said guide leg therethrough, at least one locating projection extending longitudinally from said base plate opposite said bridge to a distal end, and at least one locking tab projecting from said locating projection toward said base plate wherein said base portion is adapted to retain the support panel between said locking tab and said base plate and said clip portion is cooperable with said base portion to retain the trim panel between said base plate and said clip portion.

2. A fastener assembly as set forth in claim 1 wherein said bridge portion includes a pair of spaced apart legs projecting from said base plate for defining said slot, said locking legs of said clip portion operable with said legs to engaging and retaining said legs between said guide leg and said respective locking leg.

3. A fastener assembly as set forth in claim 2 wherein said base portion includes a pair of adjacent base plates each supporting one of said spaced apart legs of said bridge portion.

4. A fastener assembly as set forth in claim 3 wherein said base portion includes a locating projection extending longitudinally from each of said base plates to a tapered distal end.

5. A fastener assembly as set forth in claim 4 wherein said base portion includes a locking tab projecting from each of said locating projections to a distal end spaced below said respective base plate.

6. A fastener assembly as set forth in claim 5 wherein said bridge interconnects said base plates to provide resilient separation between said locating projections.

7. A fastener assembly as set forth in claim 6 wherein said base portion further includes at least one nub for joining said locating projections.

* * * * *